3,168,426
COATING OF MATERIALS WITH POLYMERS
Ian Blackie, Blyth, England, assignor to Formica Limited, London, England, a corporation of Great Britain
Filed June 28, 1961, Ser. No. 129,931
Claims priority, application Great Britain, June 29, 1960, 22,817/61
15 Claims. (Cl. 156—306)

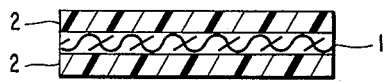
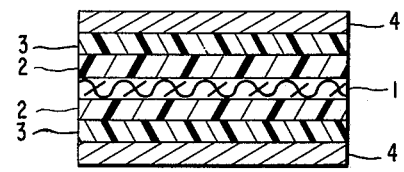
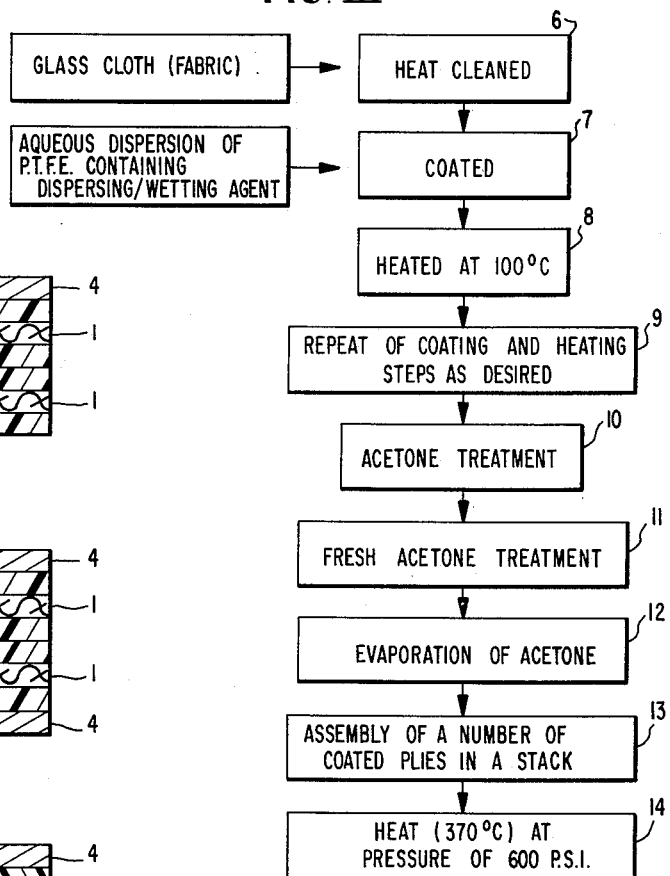
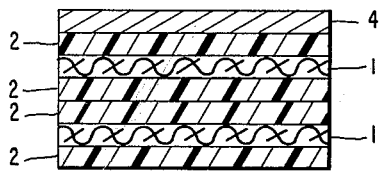
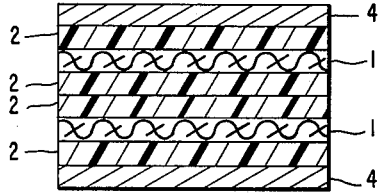
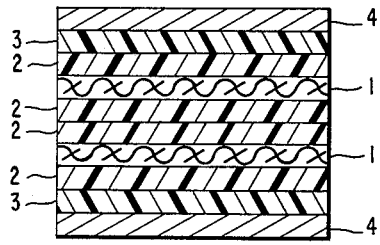
INVENTOR.
IAN BLACKIE
BY Baldwin & Wight
ATTORNEYS United States Patent Office 3,168,426
Patented Feb. 2, 1965

This invention relates to the coating or treating of materials with polymers from colloidal solutions, for example aqueous dispersions or organosols, of the same.

Fibrous base materials coated with polymers have many uses in industry, for example glass fibre fabrics when coated with polytetrafluoroethylene (PTFE) are used widely in the electrical and electronic industries particularly in applications where constant values of power factor and relative permittivity are required over wide ranges of frequency. Direct application of polymers to such fibrous materials is extremely difficult, if not impossible, and accordingly it is customary first to prepare a colloidal solution of the polymer and subsequently to coat the fibrous material from such solution.

After the coating operation it is necessary to remove the dispersion medium and this is usually done by heating. However, in order to obtain efficient colloidal dispersions it is necessary to include therein dispersing/wetting agents which perform the dual function of dispersing the polymer and assisting it to wet any surface with which it comes into contact, and it is necessary also to remove these agents from the coated material. A known method of doing this is to subject the coated fibrous materials, after the removal of the dispersion medium, to heat treatment at about the boiling point of the agent until the latter has evaporated, but such treatment is not entirely saisfactory.

I have found, for example, that in the case of PTFE coated glass fibre materials heat treatment to remove the dispersing/wetting agent has a number of undesirable results. The most important of these is the imposition of a limit on the general electrical properties and the power factor in particular which is independent of the PTFE content above a certain figure. A further effect is that, when several coatings of PTFE are applied, each followed by the removal of the dispersion medium and sintering at 370° to 380° C. to coalesce the polymer particles and to render the coating resistant to abrasion, difficulty is experienced in wetting each subsequent coating as the process proceeds. Additionally the material becomes discoloured.

In one particular case I coated a heat cleaned pure glass fabric sheet containing no residual sizing agents, from aqueous dispersion of PTFE, heated the material at 100° C. to remove the water and then baked it at 280° to 290° C. at atmospheric pressure to volatilize the dispersing/wetting agent. The product was not white, as would have been expected, but was tinged brown, and because of the purity of the components used, I deduced that this was due to the effect of heat on the agent. An analysis of the product proved that the dispersing/wetting agent had decomposed giving rise to residual carbonaceous material. Subsequently I several times repeated the coating, drying and sintering processes in order to build up a greater thickness of polymer coating, but found that, after the second or third time, the dispersion was not wetting the previous layer efficiently and that this was due to the presence of incompletely removed dispersing/wetting agent, and also to its decomposition products being occluded within the coating. A definite pattern developed wherein the shorter the time of the heat treatment the more agent remained, the darker became the coating and the more resistant the coating became to wetting. I found also that, with a given percentage of agent in the dispersion used, it was impossible to produce finished products, comprising several plies of coated material laminated under temperature and pressure, having power factor values below 0.001 even with a PTFE content as high as 75% calculated on the total weight of the material, and discovered that this was also due to the inefficient removal of the dispersing/wetting agent, and more particularly to the presence of residual carbonaceous material. This effect was confirmed by experiments utilising higher percentages of agent in the dispersion which gave rise to finished products darker in colour and having higher power factors.

One object of this invention is the production of materials, coated or treated with polymers from colloidal solutions, the properties of which materials in their final condition are not impaired by the presence of any impurities or foreign bodies remaining after or produced during the coating or treating process.

A further object of this invention is the efficient removal from materials, coated or treated with polymers from colloidal solutions, of dispersing/wetting agents present therein.

In FIGURE I, the drawing shows a cross-section through an article made in accordance with the present invention and In FIGURE II, a cross-section through a modified form of article made in accordance with the present process.

The drawing shows in FIGURE III, a flow chart illustrating the successive steps of the process of the invention.

In FIGURE IV, the drawing shows a stack of a plurality of plies, a sheet of copper on the stack, and the stack subjected to heat and pressure.

In FIGURE V, the drawing shows a stack of a plurality of plies, a sheet of cooper placed on each of opposite sides of the stack, and the stack subjected to heat and pressure.

In FIGURE VI, the drawing shows a stack of a plurality of plies, a sheet of cooper placed on each side of the stack, a layer of pure polytetrafluoroethylene between each of the copper sheets and the stack, and the stack subjected to heat and pressure.

According to this invention a process for the removal of dispersing/wetting agent from a material coated or treated with a polymeric material from a colloidal solution containing such an agent, comprises subjecting the material to the action of a solvent for such agent, such solvent having no substantial effect upon said polymeric material.

Preferably the colloidal solution comprises an aqueous dispersion or an organosol.

The invention is particularly applicable to coating from colloidal solutions of perfluorocarbon polymers, especially polytetrafluoroethylene.

In practice the dispersion medium is first removed by heating the coated material at a temperature and for a sufficient time to volatilize the former completely. Further coatings may then be applied and the solvent extraction may take place after each coating or after the last coating.

The invention is particularly useful in the production of laminated materials comprising fibrous materials coated with perfluorocarbon polymers in which, after the solvent extraction, one or more plies of the materials are heated under pressure with or without previous heat treatment to sinter and coalesce the polymer.

*Example 1*

The following example is one embodiment of the invention. PTFE was coated on to "Y101" weave, "T2" heat-cleaned glass cloth obtained from Fothergill & Harvey Ltd. from a dispersion of PTFE sold by Imperial Chemical Industries Ltd. under the trade nomenclature "G.P.I." "G.P.I." is an aqueous dispersion of negatively charged PTFE particles of colloidal size having a specific gravity of 1.5, a PTFE content of 60% based on the total weight of the dispersion, a dispersing/wetting agent content of 6% based on the weight of PTFE and a pH of approximately 10; the dispersing/wetting agent is a condensation product of an alkyl phenol and ethylene oxide. The coating was heated at about 100° C. to remove the water, and the process was repeated three times to produce a PTFE content of 75% based on the total weight of the material. The dispersing/wetting agent was then quantitatively removed by subjecting the material to the action of acetone for five minutes at 20° C. followed by a final rinse in clean acetone, and thereafter evaporating the acetone. Three plies of the thus coated glass fabric were assembled in a stack and subjected to a pressure of 600 p.s.i. at a temperature of 370° C. to coalesce the polymer and to consolidate the plies. The product was white to off-white in colour and had a power factor of 0.0006 and a relative permittivity of 2.52 at one megacycle/second at 20° C.

For comparative purposes the same fabric was treated with the same dispersion in the same general manner, but attempts were made to remove the solvent by heat treatment at 280° to 290° C. for two to three minutes. After pressing, the final product has a power factor between 0.0010 and 0.0020 and a permittivity of 2.5 to 2.6 at one megacycle/second at 20° C. I found that an increase in PTFE content above 75% on the total weight of the coated material did not reduce the power factor below 0.001.

Common dispersing/wetting agents are non-ionic long chain ethers or alcohols or salts of long chain sulphonated acids. Suitable solvents include aromatic hydrocarbons, chlorinated hydrocarbons, ethers or ketones. Acetone although particularly efficient is not recommended for industrial use because of its low flash point, and the non-flammable chlorinated hydrocarbons have the disadvantage of being toxic. For these reasons we prefer to use the monomethyl/ether of ethylene glycol, alternatively known as Methyl Cellosolve, which is effective at 25° C., non-toxic and has a very high flash point.

The process according to this invention is particularly applicable to the manufacture of PTFE/glass fibre laminates which are provided on one or more surfaces with a layer of copper. Such materials are required in the electrical and electronic industries and are suitable for the production of printed circuits by appropriate etching of the copper. In the production of such materials it is preferable to include between the PTFE treated glass cloth plies and the copper a thin film of PTFE.

Although the example given in the specification refers to the coating of a fibrous material with PTFE from an aqueous dispersion the invention is not so limited but extends also to the coating of any suitable material from a colloidal solution of any polymer, copolymer or other polymeric material.

In FIGURE I of the drawing, there is shown an article produced in accordance with the present invention in which a center ply of glass fabric 1 is coated with exterior plies 2 and 2 of PTFE forming an exterior ply on each face of the glass fabric.

In FIGURE II, the article shown has inner plies of the character illustrated in FIGURE I to which have been applied further plies 3 of pure PTFE as explained above to form a preferred type of bond for exterior plies of copper foil 4 to the layers of pure PTFE.

The flow chart shown in FIGURE III of the drawing illustrates the processing in accordance with this invention. The glass fabric is passed through hot cleaning zone 6 and then through coating zone 7 where a dispersion of PTFE is applied, and the coated fabric then heated at 100° C. in zone 8 to remove water. The coating and heating may be repeated as desired at zone 9 to produce a coating of desired character. The coated fabric is then treated in zone 10 with acetone to quantitatively remove the dispersing wetting agent followed by the final rinse in zone 11 with clean acetone, and thereafter evaporation of acetone in zone 12. The plies of thus coated fabric are assembled in stacking zone 13 and subjected to heat and pressure in zone 14 to coalesce and consolidate the plies.

*Example II*

In FIGURE IV, an article is shown produced in accordance with the present invention wherein a plurality of plies treated as in Example I are assembled into a stack, and a sheet of copper is placed on the stack before the pressing operation, and the pressing then carried out.

*Example III*

In FIGURE V, an article is shown produced in accordance with the present invention wherein a plurality of plies treated as in Example I are assembled into a stack, and a sheet of copper is placed on each side of the stack before the pressing operation, and the operation completed as in Example I.

*Example IV*

In FIGURE IV, an article is shown produced in accordance with the present invention wherein a plurality of plies treated as in Example I are assembled into a stack, and a sheet of copper is placed on both sides of the stack with a layer of pure polytetrafluoroethylene between the copper sheets and the stack, and the operation then completed as in Example I.

What is claimed is:

1. A process for the removal of non-ionic dispersing/wetting agents from a material treated with a polymeric material from a colloidal solution containing such an agent and previously dried at a temperature below the decomposition temperature of said dispersing/wetting agent, which consists in subjecting the treated material to the action of a solvent for such agent for extraction thereof, such solvent having no substantial extractive effect upon said polymeric material.

2. A process as claimed in claim 1 in which the polymeric material comprises a perfluorocarbon polymer.

3. A process as claimed in claim 2 in which the perfluorocarbon polymer is polytetrafluoroethylene.

4. A process as claimed in claim 1 in which the solvent used is selected from the group consisting of an ether, and a ketone.

5. A process as claimed in claim 4 in which the solvent used is acetone.

6. A process as claimed in claim 4 in which the solvent used is mono-methyl ether of ethylene glycol.

7. A process as claimed in claim 1 in which the material treated with a polymeric material is fibrous in nature.

8. A process as claimed in claim 7 in which the material comprises glass fibres in the form of a woven fabric.

9. A process which comprises treating a fibrous material with a dispersion of a perfluorocarbon polymer, which dispersion contains a non-ionic dispersing/wetting agent, heating the material at a temperature below the decomposition temperature of the dispersing/wetting agent in order to volatilize the dispersion medium completely and extracting from the treated and heated material by the action of a solvent said dispersing/wetting agent, said solvent having no substantial extractive effect upon said polymeric material.

10. A process which comprises treating a fibrous material with an aqueous dispersion of polytetrafluoroethylene which dispersion contains a non-ionic dispersing/wetting agent, heating the material at a temperature below the decomposition temperature of the dispersing/wetting agents in order to volatilize the aqueous dispersion medium completely and extracting from the treated and heated material by the action of a solvent said dispersing/wetting agent, said solvent having no substantial extractive effect upon said polymeric material.

11. A process as claimed in claim 10 in which the dispersion medium is first removed from the polytetrafluoroethylene-treated material, the dispersing/wetting agent is removed by the solvent, the residual solvent is evaporated and the treated material is subjected to the action of heat and pressure to sinter and coalesce the polymer.

12. A process as claimed in claim 10 in which the dispersion medium is first removed from the polytetrafluoroethylene-treated material, the dispersing/wetting agent is removed by the solvent, the residual solvent is evaporated, a plurality of plies of the so-treated material are assembled in a stack and the stack is subjected to the action of heat and pressure to sinter and coalesce the polymer and to produce a unitary product.

13. A process as claimed in claim 10 in which the dispersion medium is first removed from the polytetrafluoroethylene-treated material, the dispersing/wetting agent is removed by the solvent, the residual solvent is evaporated, a plurality of plies of the so-treated material are assembled in a stack, a sheet of copper is placed on the stack, and the stack is subjected to the action of heat and pressure to sinter and coalesce the polymer and to produce a unitary product.

14. A process as claimed in claim 10 in which the dispersion medium is first removed from the polytetrafluoroethylene-treated material, the dispersing/wetting agent is removed by the solvent, the residual solvent is evaporated, a plurality of plies of the so-treated mataerial are assembled in a stack, a sheet of copper is placed on both sides of the stack, and the stack is subjected to the action of heat and pressure to sinter and coalesce the polymer and to produce a unitary product.

15. A process as claimed in claim 10 in which the dispersion medium is first removed from the polytetrafluoroethylene-treated material, the dispersing/wetting agent is removed by the solvent, the residual solvent is evaporated, a plurality of plies and the so-treated material are assembled in a stack, a sheet of copper is then placed on both sides of the stack with a layer of pure polytetrafluoroethylene between said copper sheets and the stack whereafter the so-assembled stack is subjected to the action of heat and pressure to sinter and coalesce the polymer to produce a unitary product.

References Cited by the Examiner
UNITED STATES PATENTS

| | | | |
|---|---|---|---|
| 2,561,449 | 7/51 | Ruderman. | |
| 2,964,436 | 12/60 | Mikulis et al. | 156—306 X |
| 3,010,536 | 11/61 | Plurien et al. | 117—63 X |
| 3,023,120 | 2/62 | Goldsmith et al. | 117—63 X |
| 3,086,071 | 4/63 | Preston | 156—333 |

FOREIGN PATENTS 529,363  8/56  Canada.

RICHARD D. NEVIUS, *Primary Examiner.*

JOSEPH B. SPENCER, *Examiner.*